(12) United States Patent
Predtechensky et al.

(10) Patent No.: US 6,586,129 B2
(45) Date of Patent: Jul. 1, 2003

(54) LIQUID ELECTROLYTE FUEL CELL

(75) Inventors: Mikhail Rudolfovich Predtechensky, Novosibirsk (RU); Vladimir Eliferievich Nakoriakov, Novosibirsk (RU); Igor Borisovich Kouznetsov, Novosibirsk (RU); Lev Semyonovich Tchernoy, Moscow (RU); Andrey Nikolaevich Smal, Novosibirsk (RU); Nikolay Vasilyevich Guelfond, Novosibirsky Region (RU)

(73) Assignee: Aquarius Technologies Limited, Nasso (BS)

( * ) Notice: Subject to any disclaimer, the term of this patent is extended or adjusted under 35 U.S.C. 154(b) by 4 days.

(21) Appl. No.: 09/749,740

(22) Filed: Dec. 28, 2000

(65) Prior Publication Data

US 2002/0155339 A1 Oct. 24, 2002

(30) Foreign Application Priority Data

Aug. 6, 2000 (RU) ........................ 2000129783

(51) Int. Cl.⁷ .............................. H01M 4/86; H01M 8/14
(52) U.S. Cl. ........................................... 429/40; 429/46
(58) Field of Search ........................ 429/40, 41, 44, 429/46

(56) References Cited

U.S. PATENT DOCUMENTS 4,548,876 A * 10/1985 Bregoli .................. 429/40 X
4,554,225 A * 11/1985 Sounai et al. ............ 429/41 X
4,797,379 A * 1/1989 Patel et al. ............. 429/41 X

FOREIGN PATENT DOCUMENTS

WO   WO 01/95414  * 12/2001 ............ H01M/8/14

* cited by examiner

*Primary Examiner*—Stephen Kalafut
(74) *Attorney, Agent, or Firm*—Fulbright & Jaworski LLP

(57) ABSTRACT

The invention relates to fuel cells. Fuel cells are devices which transform chemical power in to electrical power. The subject fuel cells are of simpler structure and lower cost than those previously known. The subject fuel cells include a housing chamber containing molten carbonates and two electrodes at least partially immersed in said molten carbonates. The electrodes comprise an internal working space and have pores dimensioned so that gas is kept within the electrode by capillary forces.

13 Claims, 2 Drawing Sheets

LIQUID ELECTROLYTE FUEL CELL

BACKGROUND OF THE INVENTION

The invention relates to fuel cells i.e. the devices which transform chemical power to electric power. It may be used as a source of electric power in any branch of industry, mainly in power engineering, mechanical engineering, and etc.

Fuel cells in general include a pair of porous electrodes, cathode and anode, and an ionic conductor, electrolyte, which is the solution of alkali, acid or melt of carbonates placed between the electrodes. Depending on the physical state of the electrolyte, the fuel elements are classified into elements with liquid electrolyte and solid electrolyte. During operation of the fuel cell, gaseous reagents come through porous electrodes: through the anode penetrates fuel and through the cathode penetrates the oxidant. Usually hydrogen ($H_2$), and more rarely carbon oxide (CO), methane ($CH_4$), and oxygen ($O_2$), including oxygen from air as the oxidant, are used as the fuel for the fuel cells.

For example, in the oxygen-hydrogen fuel cell with an alkali electrolyte, the electric oxidation of the hydrogen on the anode occurs:

$$2H_2 + 4OH \rightarrow 4H_2O + 4e$$

and electric deoxidization of the oxygen occurs on the cathode:

$$O_2 + 2H_2O + 4e \rightarrow 4OH$$

At the same time, the hydroxide-ions move in the ionic conductor-electrolyte from cathode to anode. The overall reaction is:

$$2H_2 + O_2 \rightarrow 2H_2O$$

As the result of overall reaction, the EDS (electric dynamic power) arises in the external circuit between the cathode and anode, the direct electric current flows, i.e. the direct transformnation of chemical reaction to the electric one takes place (N. V. Korovin "Fuel cells"—Soros's educational magazine, No. 10, 1998, pgs.55–59). Since the described process of chemical energy transformation does not have any intermediate stage of heat generation, the fuel cells are specified with a high value of kpd (efficiency).

It is well-known, for example, the fuel cell consisting of porous matrix impregnated with necessary quantity of liquid electrolyte of electrodes pair: fuel electrode (supplying the hydrogen for the cell) and air electrode (supplying oxygen for the cell) which are located on both sides of the porous matrix (U.S. Pat. No. 5,677,073 MIK H01m27/00). The imperfection of this generator is the complicated and quite expensive cell production. This expense is due to the special materials required for the matrix. The need for special means of permanent control after the quantity of electrolyte decreases during generator operation and the need for special means of integration of elements in batteries.

A cell with the molten carbonates as the electrolyte is known (U.S. Pat. No. 4,554,225 MPK H01m27/00). The electrolyte is made in form of the plate of porous material and consisting molten carbonate at operating temperature. The electrodes cathode and anode are tightly adjacent to the opposite surfaces of the plate with electrolyte and are also made in the form of porous two-layers plates. The layer of electrode adjacent to the electrolyte is of such poor dimension that capillary interaction with the electrolyte takes place. It may be made of fibrous or powdery material. The second layer of the electrode has a different dimension of pores, unsuitable for capillary interaction with the electrolyte, and it is combined with a delivery device for oxidative or fuel gas. Working (fuel and oxidative) gases form on the surfaces of the respective electrodes, jointing to the electrolyte surface through the pores of electrodes and on the jointing surface of electrolyte occur respective chemical reactions of oxidization and deoxidization and it results in a rise of EDS. This fuel cell is the closest analogue of the offered cell and is recognized as a precursor of the invention. The main imperfection of the precursor is its high cost conditional to the complicity of porous elements production—the plates for electrolyte and electrodes. Thus, the unit of power received from such source is quite expensive.

BRIEF SUMMARY OF THE INVENTION

The offered invention solves the problem of fuel element cost on the account of its structure as a whole and its separate parts simplification and, as such, decreasing cost of the unit of power.

The solution for the problem is found by offering a fuel cell consisting of encapsulated molten carbonate, at temperature not lower than the melting temperature, and cathode and anode each connected to the device supplying the working gas: fuel gas to anode and oxidizing gas, and made in the form of impervious shell limiting its internal space filled with the working gas, herewith at least the part of the electrode shell immersed into the molten carbonates contains the catalyst for the chemical reaction of oxidization on the anode and deoxidization on the cathode, and they are provided with openings which dimension is of such value that the gas is kept inside the electrode shell and the molten carbonates are kept outside the mentioned shell for the account of the capillary forces.

The electrodes pairs may be placed in rows both along width and length of the chamber in one common chamber filled with molten carbonates.

In order to intensify the chemical processes occurring in fuel cell, the surfaces of electrodes, at least in the part neighboring the electrolyte, is covered with the layer of catalyst or the electrode in whole is covered with these materials. Since the electrodes operate in chemically corrosive medium, the catalyst is required to be not only highly chemically active but highly chemically stable as well. Lithinated (treated with lithium) nickel oxide is used as the cathode catalyst. Nickel and its alloys melts are used as the anode catalyst.

The shell of each electrode may be produced, for example, of the metal mesh with cell dimension 1–200 micrometers or of the metal wire winded in shape of spiral with the spacing less 200 micrometers. In this case the shell should be immersed in whole into electrolyte and contain the catalyst over all surface.

The electrode shell may be combined as well—partially solid, partially—permeable. In this case only the permeable part of the shell provided with the openings shall be immersed in the electrolyte and contain the respective catalyst.

DETAILED DESCRIPTION OF THE INVENTION

Figure 1:
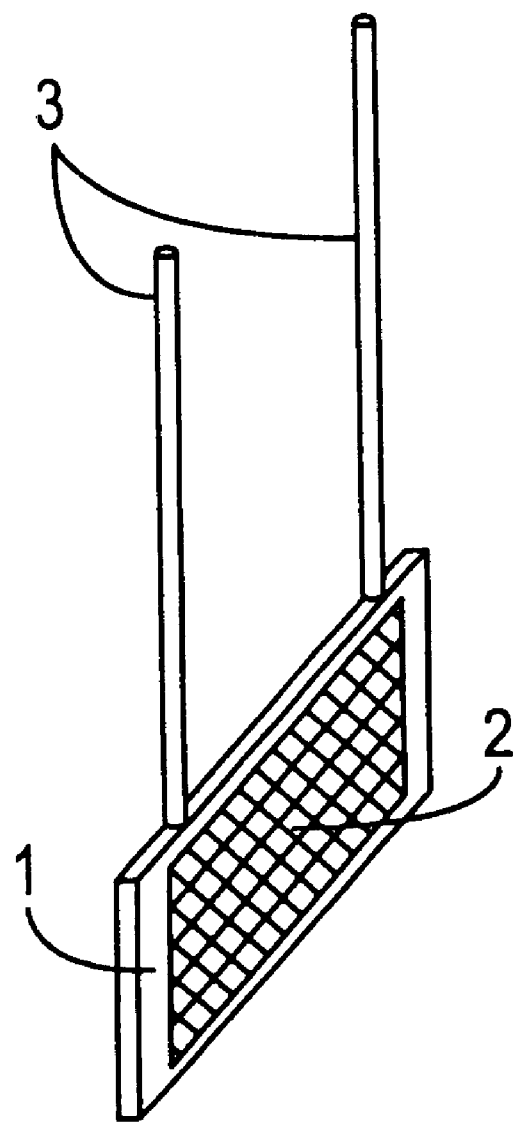
FIG. 1 shows an electrode according to the present invention.

FIG. 1 shows the simplest variant of the electrode with metal mesh where the electrode shell is of box shape—metal frame (1) functions as the casing for meshed walls (2). The internal space of electrode is connected with pipes (3) to the device supplying the working gas.

Oxygen from air is used as the oxidizing gas in the considered fuel cell.

Hydrogen is used as the fuel gas, or synthesis gas or methane or natural gas are used as the fuel gas.

A mix of lithium carbonate, potassium carbonate and sodium carbonate is used as the carbonate.

Figure 2:
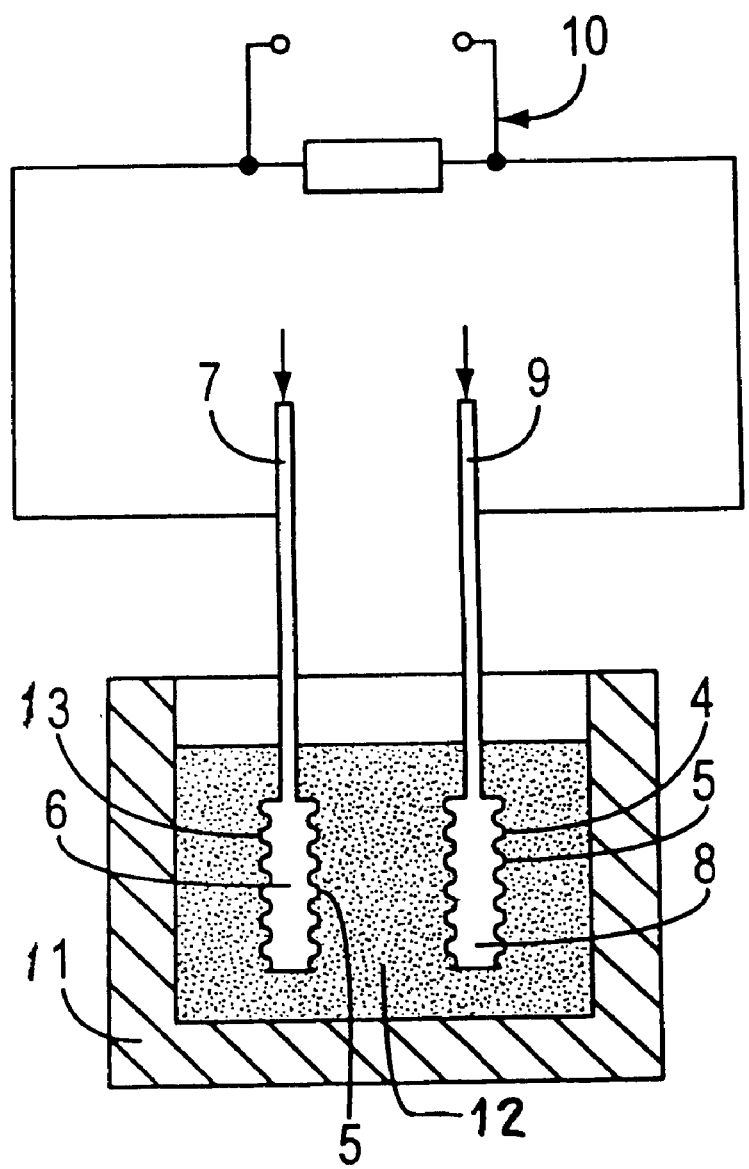
FIG. 2 shows a fuel cell according to the present invention.

The described fuel cell is shown in FIG. 2 and operates in the following manner.

The pair of electrodes, anode (13) and cathode (4), are placed in the chamber (11) filled with the mix of lithium, sodium, potassium carbonates (12). The shell of each electrode (5) is made of metal nickel mesh with cell dimension of 20 micrometers. Nickel is the catalyst for the anode and under operation of the fuel cell passes quick oxidization of cathode's nickel mesh and produces the catalyst for the cathode-lithinated (treated with lithium) nickel oxide. The internal space of anode is filled with the fuel gas hydrogen (6) and connected through the gas flue (7) with the device supplying it with hydrogen and the internal space of the cathode filed with the air (8) and connected through the gas flue (9) with the device supplying it with air.

The fuel cell can operate at the temperature not lower than the carbonates melting temperature. The following reactions occur on the surface of electrodes shells under its operation:

$$2H_2 + 2CO_3^{2-} \rightarrow 2H_2O + 2CO_2 + 4e$$

$$O_2 + 2CO_2 + 4e \rightarrow 2CO_3^{2-}$$

The occurrence of the chemical reactions mentioned above results in a rise of EDS between cathode and anode in the external circuit (10), direct electric current flows i.e. the direct transformation of chemical power to electric one.

Under operation of fuel cell, the internal space of the electrodes maintains the overpressure of gas on a level not permitting the working gas to come out of the shell and electrolyte to stay outside and not to penetrate to the internal space of electrode. Herewith, along the edge of the openings made in the shell of the electrode is created a so called triple boundary where the respective catalyst, working gas and liquid electrolyte are together and where the desirable chemical reactions take place.

So, the offered invention has a simpler structure compared to those earlier known, lower cost, i.e. expensive microporous elements are substituted with smooth ones (for example, the net of the smooth electrodes), and a reduced need for expensive and complicated matrices for the electrolyte.

| Contents | |
|---|---|
| 1. Introduction | 3 |
| 2. What is the fuel cell (FC) | 3 |
| operation principle, types of FC | 3 |
| advantage of FC comparing with traditional sources of energy | 5 |
| 3. FC Market | 5 |
| market conditions at the moment | 5 |
| prognosis and peculiarities of the market | 8 |
| 4. FC Economics: | 11 |
| forming the FC value, influence of the scale of the production | 11 |
| cost of the electric energy | 13 |
| comparison with other technologies of electric energy generation | 14 |
| platinum problem | 15 |
| 5. Proposals of the project Performer | 16 |
| structural features of the existing FC, determining their cost and credibility | 16 |
| technical opportunities to decrease cost of the FC | 16 |
| scientific backlog of the Performer | 17 |
| Scientific and Research works and Scientific and Research and construction works on the Performer's proposals | 17 |
| 6. Conclusion | 18 |

"Fuel cells can be the most important technology, which the world needs for continuing world economic growth, compatible with ecological safety of the planet". Dr. Arthur Little 1. *Introduction Fuel cells (FC) are a technological miracle, generating electricity, heat and water by electrical-chemical method without mechanical moves, noise or pollution. Fuel cells, discovered 150 years ago and used in space ships and other high technology industries during the last decades, are at the threshold of a break through in economical and commercial barriers to the energy market.

Compact and long, FC can be installed almost everywhere including most of the constructions and transport means. Having power from 20 kilowatt to 2 megawatt, they provide strategic effectiveness and advantages over common industrial technologies such as industrial gas turbines, united cycles and diesel generators. FC in complex with gas turbines and heat pumps create the newest energy cycle with unprecedented electric effectiveness of 70% and higher and coefficient of fuel use up to 98%. Such highly effective configuration will have lower emissions of carbon dioxide compared to any traditional energy system and is the biggest dream of ecologists and power engineers.

In connection with the above said, development and practical introduction of the energy installations at the FC is the problem of creation of effective, ecologically clean power engineering and therefore is a strategic direction of the science and techniques in the nearest years. Almost in all developed countries there are prioritized national and interstate programs of development of energy installations at the FC. It is also possible to list tens leading foreign companies working actively in the direction of commercialization of the FC.

In the present note there is made an overview of the modern condition in techniques, economic and in the FC market. The ideological essence of the proposals, basing of the authors' inventions, on technical development of the FC and decrease of their value is briefly formulated. Market analysis is made basing on the latest foreign economic and analytical reviews.

2. What is the fuel cell (FC).

Operation principle, types of the FC

The operation principle of the fuel cell (FC) is similar to the operation principle of the galvanic cell. Constructively, FC includes electrodes (anode and cathode) and electrolyte filling the space between electrodes. If reagents are inseparable part of the galvanic cells, in the FC reagents arrive as consummated. Reagents in the FC are such substances as hydrogen, natural gas, methanol etc. (as fuel) and oxygen or air (as oxidant). There are both liquid and hard electrolytes use in the FC. Types of the FC and possible spheres of their application are given in the Table 1.

TABLE 1

| Type of fuel cells | Application |
|---|---|
| Fuel cells with alkaline electrolytes | Military: submarines Civil: space flying apparatuses (ships "Columbia", USA; "Buran", Russia) public buses, taxis. |
| Fuel cells with phosphate electrolytes | Military: isolated generating plans at the military bases Civil: loaders and public buses; decentralized generating plants (for hotels, farms, hospitals etc.) |
| Fuel cells with molten carbonate electrolytes | Civil and military: Isolated generating plants, at that generated heat can be used both for generating of the electric energy and for heating. Natural gas is used as a fuel. |
| Fuel cells with proton conductive membranes | Military: submarines Civil: laptops, video cameras; Auto-loaders, multifunctional minicabs, public buses |
| Fuel cells with hard-oxide electrolytes | Civil: blocks for laboratory researches; centralized and isolated generating plants |

The closest to the practical realization in stationary energy installations are the FC with liquid electrolytes. Among them the most perspective is the FC, where phosphate (PFC) and molten carbonates (MCFC) are used as electrolytes.

Scheme of work of the FC is shown in the FIG. 2. Constructively, the FC includes two cameras filled correspondingly with the fuel and oxidant. Cameras are limited with porous electrodes-catalysts. In the same way it is done in the galvanic cell, electrodes in the FC are electrically connected between themselves through electrolyte. As a result of electric and chemical reactions going on the surface of electrodes-catalysts at the border gas-electrolyte, a difference of potentials arises between electrodes. Electric current flows through the load in the electric chain at closing of electrodes between themselves. A typical amount of the difference of potentials between the electrodes in a certain cell of the FC is 0.5–1 watt. Therefore, depending on the requirements to the amount of the out-going tension, there are used different serial-parallel schemes of commutation between certain cells of the FC. Water is usually the product of the electric chemical reaction in the FC.

Fuel camera

Porous electrode-catalyst

Oxidant camera

Porous matrix with electrolyte

Picture 1 Scheme of the traditional FC

Advantages of the FC comparing to traditional energy generators

1. In the FC, the chemical energy of the fuel and oxidant constantly supplied to the electrodes turns, as a result of electric and chemical reaction, directly into electric energy without intermediate steps inherent to traditional schemes of generating the electric energy. (In the heating machines the following technological chain is used for generating of the electric energy: chemical energy of the fuel and oxidant—compression chamber—heat—turbine-mechanical energy—electric generator electric energy).

As a result, fuel cells have a high degree of efficiency—40–75%, and in complex with heat pump, the degree of efficiency reaches 98% at the utilization of the heat.

2. The degree of efficiency of electric and chemical generators on the FC is nearly independent of the level of their power. This allows the creation of highly effective autonomous energetic complexes of medium and low power (from 0.1 to 10 megawatt) directly for use by the consumer and with decreased expenses on the construction of power transmission lines.

3. Generating the electric energy in the FC is environmentally appropriate process (product of the electric and chemical reactions is water).

4. There are no noise sources at work of the FC.

The fact that energy systems of space apparatuses "Buran", "Appollo", "Shuttle" worked using the FC proves the effectiveness of the FC usage.

3. The FC market

Market condition at the present moment

The present moment can be characterized as beginning of forming of the FC market. There are more than 200 demonstration stations working using the FC in the world, with total power more than 40 megawatt. Almost 75% of them were installed in Japan, more than 15% in the North America and 9% in Europe. The company "International Fuel Cells" (IFC, USA) in partnership with "Toshiba" produced more than 70%, "Fudji" more than 25% and "Mitsubishi" approximately 2%.

Information on situation of the existing stations using the FC and companies that produce them is presented in the Table 2.

TABLE 2

| Type of the fuel cells (FC) | Power | Manufacturer | Place of installation | Status |
|---|---|---|---|---|
| Fuel Cell with liquid electrolyte | 11 megawatt | Japan | Japan | Demonstrational |
| | 5,4 megawatt of direct current | Company "Ansaldo" (Italy) | Italy | Demonstrational |
| | 5 megawatt | Japan | Japan | Demonstrational |
| | 1 megawatt | Japan | Japan | Demonstrational |
| | 200 kilowatt | Company "Ansaldo" (Italy) on the license from "Onsi" | Italy | Commercial from 1 November 1999 11 functioning stations |

TABLE 2-continued

| Type of the fuel cells (FC) | Power | Manufacturer | Place of installation | Status |
|---|---|---|---|---|
| | 200 kilowatt | Company "Onsi" (USA) | All over the world | Commercial more than 100 functioning stations, 185 stations sold, 285 applications |
| The FC with liquid electrolyte from the melt of carbonates (MCFC) | 2 megawatt | "Energy Research Corporation" (ERC), USA | USA | Demonstrational |
| | 280 kilowatt | Company "Daimler Benz" (Germany) together with "Energy Research Corporation" (ERC), USA | Germany | Demonstrational |
| | 3 × 250 kilowatt | Firm "Mc-Power" | USA | Demonstrational |
| | 250 kilowatt, 200 kilowatt, 1 megawatt | Japan | Japan | Demonstrational |
| | 100 kilowatt | "Ansaldo" (Italy) with "International Fuel Cell" (USA) | Spain | Demonstrational |
| | 25 kilowatt | "International Fuel Cell" (IFC), (USA) | USA | Demonstrational |
| | 14 kilowatt | Company "BCN" (Holland) together with "Mc-Power" (USA) | Holland | Probation, it is planned to start up the stations 200–2000 kilowatt in the period from 2000 to 2002 |
| FC with hard-oxide electrolytes | 100 kilowatt | "Energy Distributor Companies" (Holland) together with "Westinghouse Electric Corporation" (USA) | USA | Demonstrational |
| | 25 kilowatt | "Westinghouse Electric Corporation" (USA) | USA | Demonstrational |
| | 10–20 kilowatt | Company "Siemens" (Germany) together with company "ECH" (Holland) | Germany | Demonstrational |
| | 10 kilowatt | Company "Statoil" (Norway) | Norway | Demonstrational |
| | 5 kilowatt | Japan | Japan | Demonstrational |
| | 2 × 1 kilowatt | "Sulzer Heksis" (Switzerland) together with company "ECH" (Holland) | Switzerland | Demonstrational |
| FC with proton conductive membrane | 250 kilowatt | "Aletohm Electric group" (Germany), on the license of company "Ballard" (Canada) | Germany | Demonstrational |
| | 250 | Company "Ballard" (Canada) | Canada | Demonstrational |
| | 55 kilowatt | Company "Siemens" (Germany) | Germany | Demonstrational |
| | 50 kilowatt | Company "De Nora" (Italy) | Italy | Demonstrational, developed in 1988 |

Among stations listed in the Table 2, only stations PC25 with power of 200 kilowatt, working onhe PFC (International Fuel Cell and ONSI corp., USA), can be considered as real commercial installations. There was produced and sold already 185 of these energy installations, which work in real conditions and demonstrate commercial effectiveness.

On average, expenses for PC 25 are 25–40% less than in the usual energy systems. PC 25 have electric effectiveness (approximately 40%) greater than small diesels (36%). The utilization of the produced heat of the PC25 reaches 85%. PC25 are so environmentally appropriate that they receive special tax privileges, for example in Los-Angeles, San-Francisco, Massachusetts etc. These stations demonstrate unprecedented reliability and length of continuous work compared to competitive common generating equipment. Functioning station PC25 is drawn on the Picture 2.

However, it should be noted that with the value of the PC25 equal to $3000/kilowatt, one third of the sales are subsidized by the state for the stimulation of sales development. In the same time there is a constant decrease of the production cost. In particular, cost of the manufacturing of the PC25 decreased two times during 2 years.

Picture 2. Commercial station PC25 on PFC with the power of 200 kilowatt.

In the present time, 10 leading companies are developing technologies in the United States and about 12 leading companies in Japan and Europe have active programs directed to commercialization of the FC. There are also known many organizations in the world working on the problem of the FC.

Active penetration of FC in the market will start upon decrease in their specific value to $1500/kilowatt. Nevertheless, there are currently market niches where use of stationary generators is commercially justified at the existing prices.

In particular, consortium CLC (companies Ansaldo and ONSI (IFC/Toshiba)) plans creation of a plant working on PFC with the power of 9 megawatt, which would work at the chlorine and alkaline industry in Assemini. Chlorine and alkaline plants produce hydrogen as a side product of the electrolysis process used for production of chlorine. In the most cases hydrogen is burnt to provide steam for a factory. CLC researched possibility of using of such hydrogen as fuel at PFC for production of high quality electricity and treatment of the steam. Analysis showed that even at the existing prices on PFC this would be very profitable.

With availability of hydrogen PFC can produce electricity and to treat the steam more effectively and cheaper, than other fuel technologies. Besides, effectiveness of the PFC increases from 45 to 48%, if oxygen and hydrogen received with the help of electrolysis are used for enrichment of the fuel and air. Development of the infrastructure of hydrogen supply would provide PFC and other low temperature fuel cells with essential advantages over the other types of fuel cells and common technologies.

In Russia, development of the FC has actually stopped.
Prognosis and particularities of the FC market Specialists predict active penetration of the FC in the energy market will start in the first decade of the next century.

The need for new sources of electric energy in the nearest ten years, will amount to 130 gigawatt for the USA and 550 gigawatt for the whole world. Within the limits of these volumes, distribution according to the spheres of application in USA is as follows:

a) Replacement of the existing electric stations would amount to 15%–65% of the existing stations. This part of the market requires electric stations using FC with the power of 100 megawatt and more, using natural gas, or gas synthesized from the coal.

b) The need for the introduction of the additional new electric stations would amount to approximately 100 gigawatt. Electric stations using fuel cells with the power of 100 megawatt and more, working mostly on gas synthesized from the coal can meet this need.

c) Electric generators for industry and non-centralized electric stations would amount to 3 gigawatt. In this sphere it makes sense to use electric stations working on the FC with the power from 500 kilowatt to 20 megawatt, working on the natural gas.

Upon active development of the FC market, re-distribution of the energy market, depending on the power of the stations will occur in favor of decentralized stations with the power up to 20 megawatt.

This is something that determines evaluation of the possible volume of the FC market. If we admit that all new generators installed in the nearest ten years would be manufactured on the basis of the FC, then volume of the market would amount to 550 million dollars with the value of the generators on the FC amounting to $1000/kilowatt. Undoubtedly, this is just a guideline since the FC can not occupy the entire energy market. Nevertheless, even if the FC is allowed to fill a noticeable part of this market, which is quite a real possibility. Manufacturers of the FC generators would be able to expect substantial profit.

A range of factors contributing to the quick penetration of the FC generators in the market can be named when considering the FC generators as environmentally friendly and highly effective machines working in the wide diapason of powers with wide opportunities of decentralization.

During the last few years many countries issued decrees providing for fines for emission of carbon-dioxide gas, nitric oxide and other harmful substances. In many states of America, communal energy consumption is planned with minimum expenses and takes into account environmental factors. Recent research showed that all that affects the environment in a high degree, forces to change the legislation, creates spontaneously optimal conditions for introducing clean, highly effective technologies. Moreover, there is expected a growth of the energy needs in developing nations where population is growing and an improved standard of living is possible, but there is a big financial shortage.

In the present time it is well-known that all the above said strengthens a tendency to decentralize the energy industry. Undoubtedly, this will be an important factor in the penetration of the market for fuel cells and other systems with similar (or compatible) characteristics and performance. Notwithstanding the situation when the energy industry forms a substantial part of the economy in the wealthy countries, the tendency to decentralization has some indisputable advantages:

1. The lower amount of investments, compared to others, due to decreased expenses in infrastructure (transfer and distribution).
2. The shorter term of planning and constructing (coefficient of decrease can reach 4), which also as an important argument in favor of financing for the new powers.
3. Simultaneous use of electric energy and overflow heat (production for the closest consumer).
4. Flexibility of the energy nets for an owner of the energy system due to possibility to manage many small installations and not one big (this decreases excessive powers reserved for consumption peak).
5. Decrease of the losses for transfer of energy (which can amount to approximately 8% of the energy produced in a centralized way).

Relatively small installations are particularly important for less wealthy countries. They provide for low cost introduction of economically viable and environmentally appropriate energy, requiring less investments and shorter terms of supply. This kind of approach decreases the risk of unsuccessful investments and requires shorter economical and political guarantees.

The main moving force for the development and the introduction of the FC will be the growing ecological pressure aimed at the preservation of minerals. The following legislative factors will force this process and provide significant economy both to the manufacture and to the ultimate consumer of the FC:

1. Measures stimulating production of energy by clean decentralized installations and its supply to the network for guaranteed reasonable price.
2. Setting of low tariffs for natural gas for high effective manufactures of electric energy (for the same or even better prices as for the users of centralized networks: for example payment must be inversely proportional to the effectiveness and proportional to produced pollution, and not inversely proportional to the set powers).
3. Subsidies for safe technologies depending on the set electric power.
4. Standardization of the contract terms for supply of the energy of decentralized and centralized manufactures.
5. More attractive purchasing prices for additional electric energy from decentralized manufacturers.
6. Possibility to sell the energy produced in the decentralized way directly to an ultimate consumer.
7. Tightened requirements on harmful emissions aimed at stimulating of the environmentally appropriate technologies (if using any other technologies increased penalties are to be paid proportionally to the degree of pollution).
8. Evaluation of the general influence on the environment, including losses during distribution, optical pollution by high-voltage lines, influence of the electromagnetic fields etc.
9. Long-term legislative planning of the tariffs for provision of surety of the potential consumers of the decentralized energy (in many countries only big companies can allow planning for 20–30 ahead).

One of the important factors limiting penetration of the FC in the market is high cost of the FC. Certain time is required for the FC development before the FC would become available as a real commercial alternative.

To compete with modern gas turbines, the FC generators must cost less than $1000. In the present time, the cost of the PFC generators amounts to $3000/kilowatt. For even more perspective, high temperature MCFC specific value amounts to $18000/kilowatt. For achievement of the acceptable cost, many technological barriers must be overcome.

A goal of national programs on the FC development before 2005 is a decrease of the FC cost to $400/kilowatt ($1300/kilowatt for a complete system) for PFC and to 600 ECU/kilowatt ($1300–1800/kilowatt for a complete system) for MCFC.

However according to the opinion of analysts, the cost of the fuel cells will not be decreased rapidly. Manufacturers will have difficulties in reaching a threshold value $1500/kilowatt. When the first manufacturers reach it in the nearest years it will stay on this level for a period of time, about 5 years, until manufacturers create financial reserves and scale industry.

From the point of view of a consumer the factor, which is not less important, is credibility and term of exploitation of the FC. And factor of credibility is the most important.

Therefore, the main efforts of the developers should be aimed to optimization of credibility, price, term of the FC exploitation.

4. The FC economics

Forming the FC value, influence of the scale of the industry

From the engineering point of view, equipment for production of electric energy on the basis of fuel cells can be conditionally divided into the following components:

equipment on production of hydrogen (or synthesized gas)

direct assemblage of the fuel cells;

electric systems of transformation of outgoing direct current;

additional machines, including equipment on treatment of the air and water, aggregates of rare gas etc.;

systems of control and safety.

Equipment for production of the hydrogen consists of well-known checked components (technologies used in hydrogen installations are checked from the point of view of credibility and safety because of the important role of hydrogen for most of the refining and petrochemical complexes), meanwhile assemblage of the fuel cells and, in a less degree, transformer and additional machines are main components for development. Therefore, in the early stages of commercialization, there can be expected a decrease in the cost of the most intensively developed components, i.e. directly in the assemblage of fuel cells.

The second important factor defining the cost of the electric generators working on the FC is a scale of the production. Scale of the production in its turn is determined by the power produced by the generators and the demand for it. Apparently, specific value of the generators (in recalculation for a power unit) decreases together with increase of their power and increase of the units of production in a produced lot.

As an example of influence of an amount of production on the value of the energy block and its components there is given a variant of calculation of structured distribution of the value of certain components depending on the amount of produced blocks in the Table 3.

TABLE 3

Structured distribution of the value of energy block (type of cells PFC, nominal power 250 kilowatt) depending on the amount of produced blocks.

| Basic value $ | Pilot lot (52" block out of 5) | | Small scale production (201 block out of 100) | | Large scale production (2001 block out of 1000) | |
|---|---|---|---|---|---|---|
| 1991 | Materials $ | Construction $ | Materials $ | Construction $ | Materials $ | Construction $ |
| General fuel equipment | 184,750 | 13,000 | 140,400 | 11,700 | 98,350 | 10,400 |
| Assemblages of fuel cells | 187,500 | 13,000 | 87,500 | 11,700 | 62,500 | 10,400 |
| Tubings | 52,500 | 75,000 | 42,000 | 54,190 | 31,500 | 31,500 |
| Controlling outfit | 149,750 | 38,500 | 89,775 | 27,800 | 55,800 | 16,150 |

TABLE 3-continued

Structured distribution of the value of energy block (type of cells PFC, nominal power 250 kilowatt) depending on the amount of produced blocks.

| Basic value $ | Pilot lot (52" block out of 5) | | Small scale production (201 block out of 100) | | Large scale production (2001 block out of 1000) | |
|---|---|---|---|---|---|---|
| 1991 | Materials $ | Construction $ | Materials $ | Construction $ | Materials $ | Construction $ |
| Energy conditioner | 112,500 | 7,875 | 81,250 | 5,690 | 62,500 | 4,375 |
| EI. Isolation/coloration | 40,000 | 44,500 | 36,000 | 32,150 | 30,000 | 18,700 |
| Engineering work | — | 227,500 | — | 32,500 | — | 5,200 |
| Totally: | a 727,000 | B419,375 | 476,925 | 175,730 | 340,650 | 96,725 |
| Total a + b | 1,146,375 | | 652,665 | | 437,375 | |
| Profit | 114,640 | | 32,635 | | 8,750 | |
| General result (value of the installed block) | 1,261,015 | | 685,290 | | 446,125 | |
| Installed value for kilowatt | 4,490 | | 2,440 | | 1,590 | |

Calculation was made by a group of experts in 1991 as a production. The relatively high degree of its reliability must be noted. Only recently there has been produced first lot of the energy installations PC25 (power 200 kilowatt) in the amount more than 100. Specific value of PC25, as it was mentioned in the chapter 3 amounts to ~$3000/kilowatt (compare with data for a lot of 100 blocks in the Table 3).

If this tendency continues, in a lot with more than 1000 blocks, value of a block will be very close to the barrier of $1500/kilowatt, where exploitation is commercially justified. It should be also noted that with an increase in the amount of produced blocks, value of assemblage of the fuel cells decreases in the fastest way as a less developed component.

TABLE 4 contains data on price evaluations and allows to distribute influence of the energy block and volume of the production per amount of the possible decrease of value. Value of the installed blocks $/kilowatt (1990) for energy installations working on the fuel cells as function of the size of production.

| | Effectiveness | First copy | First lot | Large scale production | Small scale production | Automated production |
|---|---|---|---|---|---|---|
| 25 kilowatt PFC | 41.2% | — | 22,415 | 9,095 | 3,295 | 1,300 |
| 25 kilowatt MCFC | 51.1% | — | 23,460 | 9,696 | 3,465 | 1,335 |
| 250 kilowatt PFC | 47.1% | — | 4,490 | 2,440 | 1,590 | — |
| 250 kilowatt PFC | 36.9% | — | 4,550 | 2,435 | 1,580 | — |
| 250 kilowatt MCFC | 49.1% | — | 4,820 | 2,670 | 1,740 | — |
| 250 kilowatt MCFC | 50.1% | — | 5,550 | 3,135 | 2,070 | — |
| 3.25 megawatt MCFC | 53.4% | — | 2,810 | 1,835 | 1,330 | — |
| 100 megawatt MCFC | 56.6% | 1,300 | 780 | 600 | NA | NA |

Value of the electric energy

Prognosis calculation of the cost of electric energy for all systems of fuel cells is given in the Table 5. Cost of the electric energy on the level of massive production changes from approximately $0.059/kilowatt per hour for 100 megawatt installation to $0.125/kilowatt per hour for 25 kilowatt of installation (at the automated production).

TABLE 5

Prognosis data on cost of electric energy for researched energy installations working on the fuel cells

| | | Cost of electric energy ($/kilowatt per hour) with different scopes of production | | | |
|---|---|---|---|---|---|
| Power of installation | Type of installation | Pilot lot | Small scale production | Large scale production | Automated production |
| 25 kilowatt | PFC | — | 0,560 | 0,292 | 0,180 |
| | MCFC | — | 0,563 | 0,288 | 0,166 |

TABLE 5-continued

Prognosis data on cost of electric energy for researched energy installations working on the fuel cells

| Power of installation | Type of installation | Pilot lot | Cost of electric energy ($/kilowatt per hour) with different scopes of production | | |
|---|---|---|---|---|---|
| | | | Small scale production | Large scale production | Automated production |
| 250 kilowatt | PFC | — | 0,163 | 0,117 | 0,096 |
| | MCFC | — | 0,164 | 0,117 | 0,097 |
| 3,25 megawatt | MCFC | — | 0,135 | 0,105 | 0,092 |
| 100 megawatt | MCFC | 0,081 | 0,069 | 0,059 | — |

To compare there are prices for Europe in the Table 6.
Prices for communal electric energy, averaged for European countries

| Consumption of energy by consumer | Price for electric energy $ |
|---|---|
| 25 kilowatt | 0,110 |
| 250 kilowatt | 0,079 |
| 3,25 megawatt | 0,064 |

Comparison with other technologies of energy generating

The main advantage of the system of fuel cells over alternative technologies is in its higher electric effectiveness. This advantage disappears for energy installations with power of more than 100 megawatt, for which combined cycle with steam—gas—turbine systems has electric effectiveness closing to 50%. However, unlike the combined cycle, fuel cell system can work with half load with little decrease in effectiveness. Besides, because of the high temperatures used in the gas turbines, there is an emission of 130 ppm Nox (with 400% air surplus) with outgoing gases. It is much higher than it was demonstrated by the systems of fuel cells (7 ppm).

The usual way of decreasing NOx in emissions of gas turbines is admission of water or steam to the combustion chamber. Other means are in the stage of development, but here we will consider only the influence of the cost of water admission. If it is necessary to obtain a decrease of NOx in the gas turbine to 50%, the required additional capital equipment together with decrease of electric effectiveness will result in an increase of the electric energy cost of 2%. Further, if there is a goal to decrease NOx in the gas turbine to 75%, cost of the electric energy will increase by 4%. Similarly, the problem of decrease of the emission of NOx in gas generators can be achieved by the installation of a catalytic converter at the exhaust, which also requires additional investments. Even with much lower limits of the emission of NOx (lower than 7 ppm), the technology of fuel cells will manage without any additional expenses, meanwhile other technologies can not reach these limits even with high additional expenses (in a gas turbines there can be reached 10–15 ppm of the NOx, may be even lower, but with corresponding additional costs).

Results of the prognosis calculations, including the ones above, provide for a base for the evaluation of economical viability of optimized systems of fuel cells. It is clear that big decreases in the cost can be expected upon growth of the level of production, but certain aspects of the amounts of the decrease will stay in the arena of this discussion. It is important to note that cost of fuel cells will still stay in the arena of discussion, It is important to note that cost of the fuel cells shall amount to less than 20% of the total sum of expenses. Therefore many fuel cells have to come a long way before they will close to these projected prices, meantime cost of the other components can be predicted easier.

Taking into account the above said, the most perspective economical advantages of the fuel cells systems in respect of other technologies have placed in a range of power of energy installations from 250 kilowatt to 3.25 megawatt even with low sizes of production. This range is situated between lower powers where big electric effectivenesses of fuel cells systems face the problems compensation of their own significant capital expenses, and very big energy installations, where high effectivenesses can be reached by use of the most modern competitive systems as well as at the use of combined cycle of the energy installation.

For the powers up to 250 kilowatt, the general cost of electric energy is the same for systems PFC and MCFC. The higher capital expenses for systems MCFC are conditioned by higher effectiveness and, therefore, by lower investment of the fuel cost. For combined production, systems MCFC are more profitable, which is a result of the possibility of production of low temperature. They can produce heat of the higher level, but only after reconstruction of the system, what means by itself lower electric effectiveness.

The key advantage of the fuel cells systems high electric effectiveness, is of less interest, when there are required large amounts of the combined heat, especially at high temperatures. Nevertheless, at use of combined energy production, when there is required low temperature combined heat (<150°) and relatively high relations "electric energy/heat" (>0.7), fuel cells show economical advantage over other technologies.

Therefore, it can be reasonably expected that fuel cells systems will become the most economical and environmentally beneficial technology for the wide range of use of electric energy and heat, and accompanying barriers conditioned by the original value can be taken up by the markets.

Platinum problem

For fuel cells with electrolytes from phosphoric acid (PFC), unlike MCFC, platinum is used as catalyst. In connection with this, there is a question, as to whether this will be an additional factor limiting commercialization of the FC.

The following note is based upon information from the company Impala Platinum (South Africa): Despite the spread opinion that platinum is "less-common precious metal", it can be stated that now there are developed only small part of platinum ore. In the recent authoritative research concerning possibility of use of platinum for production of commercial fuel cells, there is made a conclusion that demand on platinum in this sphere can amount to 440 000–580 000 ounces (13–17% of the general demand) to the year 2000. This data and spread opinion that fuel cells will be used more and more for satisfaction of energy needs causes a question: is there enough platinum in the world, not to hold this demand? Answering this question, it is possible to consider two aspects: are the stimulus for platinum industry enough to satisfy this demand and the platinum reserves enough to provide accessibility of platinum ores for economically justified production of metal.

World platinum reserves:

Approximately 89% of the world reserves of platinum are situated in the Bushvild Fire Complex (South Africa)—is geological structure in the form of saucer with a area of 400 kilometers (Transvaal province). Plus 9% of world reserves are in the north of Western Siberia (Norilsk), where platinum group metals are extracted together with copper-nickel ores. Deposits in Stillvote (USA), Sadberry (Canada) and Hartley (Zimbabwe) represent 1.6% of the explored ore deposits.

At the present moment, platinum deposits are in depths up to 2500 meters amount to 543×106 ounces. According to the level of the demand of 1990 (3.66×106) this deposits would be enough for 148 years. But this evaluation is quite conservative, based on a proposition that there will not be any newly discovered deposits. Besides, there is the likelihood that much of the platinum would be obtained from secondary recycling of platinum catalysts and fuel cells. This will widen significantly time limits of use of discovered platinum deposits.

5. Proposals of the project Performer

Constructive features of the existing FC, determining their value and credibility The general factor limiting wide practical use of the fuel cells is their high cost. In the present time, specific value of the electric and chemical generators working on the PFC amounts to ~$3000/kilowatt, and on the MCFC $18000/kilowatt. For economically justified wide scale use of the fuel cells in the stationary conditions it is required to decrease level of their specific value by three times for PFC and on a rank for MCFC.

High cost of the FC is defined mostly by the high requirements to tile technology of production of a porous matrix with electrodes-catalysts.

In the FC with liquid electrolytes, an electrolyte is situated in the porous matrix between electrodes (see Picture 1). Electrodes being current conductors must posses with catalyst characteristic and to perform some other functions. On one hand, they provide for direct contact between electrolyte and gas with presence of catalyst. On the other hand, to exclude passing of an electrolyte to gas cameras and gas to the matrix with electrolyte, electrodes are in the same time gas and hydrodynamic lock. High working temperature and high chemical aggressiveness of electrolytes decreases significantly the spectrum of the materials that can be used for manufacturing of electrodes and matrices. To provide the above mentioned characteristics, electrodes and matrices are produced in the form of complicated multi-layer and microporous structures using special materials and the most advanced technologies.

The micro-porous structure of electrodes and matrices together with hard conditions of work (high temperature, chemically aggressive electrolyte) leads to limitations on durability and period of use of the FC. Specially it appears in the MCFC, where level of the working temperatures reaches 650° C., because of the diffusion process, accompanying electric and chemical reactions, there is change of the chemical composition of electrodes and of the electrolyte in the superficially developed porous structures.

Technical opportunities to decrease cost of the FC

As it was mentioned earlier, the main problems which should be solved for active penetration of the FC to the market, in order of importance, are: Reliability, Price, Operation lifetime.

The main areas for development of the FC are the decrease of their cost and increase of their reliability. The potential for this development lay in the increase of the efficiency of the operation for the account of the production technology improvement and development of new materials. Under this approach the main criteria of FC operation efficiency is the current density generated of the FC unit of area. At the same time the weight and dimensions of FC and the consumption of materials are decreased. This approach seems to be absolutely reasonable, especially under development of the FC for the midget transport and, of course, for applications in space.

The price and operation simplicity of FC are the main criteria for the approaches offered hereto to the prejudice of other criteria, including weight-dimension characteristics. Undoubtedly this approach is reasonable in those fields where the weight and dimensions of FC are not of the supreme importance and in the first turn in stationary power engineering.

Technical essence of the offer.

In the traditional FC the three-phases boundaries electrolyte-gas-catalyst are in stationary, static state in the micro-porous structures of electrodes. At the same time the processes of the electro- and mass-transfer are limited mostly by the diffusive processes.

We offer:

1. To use convective processes of mass transfer which are much more effective in comparison to diffusive ones.
2. To substitute the porous electrodes with the smooth ones, which are much cheaper and more reliable than the porous ones.

In the offered FC there is used convective two-phase flow of gas and electrolyte. As it was found in the course of our experiments if there are the movable boundaries-meniscus the efficiency of the electrochemical processes increases abruptly due to jointing to the reaction the gas adsorbed on the surface of the electrodes in the area of dry stains.

Evident advantages and shortcomings of the offered solution

The main advantages is the fact that the structure of the smooth electrodes is much simpler and cheaper than the porous ones. They are less exposed to the catalytic corrosion and, respectively, the continues operation lifetime of smooth electrodes is sufficiently longer. The smooth electrodes are simpler revivified in case of impairment of the catalytic properties.

We suggest that the application of the mentioned technical solutions would allow to increase the reliability and to decrease abruptly the cost of FC.

The shortcoming of new FC is the fact that their dimensions exceed the dimensions of traditional ones (linear dimensions exceed in 2–5 times). However, as it was mentioned before, if FC are applied in stationary power engineering their dimensions are not of the supreme importance.

Scientific back-log of the performer.

The staff of the performer is experienced in the sphere of the two-phase flows processes researchers. During last several years, within the limits of the scientific-technical contract with "Air Products", there was carried out the wide work on development and description of the processes in the distillation columns for gases separation. These processes are similar to the processes passing in the new FC in respect of their physical nature. There is the experience of many years researches in the field of electrochemistry.

The status of the offered ideology development

The carried out model experiments testified the possibility of effective apply of the convective processes of mass-transfer and smooth electrodes in the FC with liquid electrolyte.

What we claim is:

1. A fuel cell comprising:

a housing chamber;

molten carbonates being disposed within said housing chamber;

a first electrode at least partially immersed in said molten carbonates, said first electrode having an internal working space and having pores dimensioned so that gas is kept within the internal working space of said first electrode and said molten carbonates are kept outside the internal working space of said first electrode by capillary forces;

a second electrode at least partially immersed in said molten carbonates, said second electrode having an internal working space and having pores dimensioned so that gas is kept within the internal working space of said second electrode and said molten carbonates are kept outside the internal working space of said second electrode by capillary forces;

a fuel gas supply connected to said first electrode;

an oxidizing gas supply connected to said second electrode.

2. A fuel cell comprising:

a housing chamber;

molten carbonates being disposed within said housing chamber;

a first electrode at least partially immersed in said molten carbonates, said first electrode having an internal working space and having pores dimensioned so that gas is kept within the internal working space of said first electrode and said molten carbonates are kept outside the internal working space of said first electrode by capillary forces, and said first electrode is an anode;

a second electrode at least partially immersed in said molten carbonates, said second electrode having an internal working space and having pores dimensioned so that gas is kept within the internal working space of said second electrode and said molten carbonates are kept outside the internal working space of said second electrode by capillary forces;

a fuel gas supply connected to said first electrode;

an oxidizing gas supply connected to said second electrode.

3. A fuel cell comprising:

a housing chamber;

molten carbonates being disposed within said housing chamber;

a first electrode at least partially immersed in said molten carbonates, said first electrode having an internal working space and having pores dimensioned so that gas is kept within the internal working space of said first electrode and said molten carbonates are kept outside the internal working space of said first electrode by capillary forces;

a second electrode at least partially immersed in said molten carbonates, said second electrode having an internal working space and having pores dimensioned so that gas is kept within the internal working space of said second electrode and said molten carbonates are kept outside the internal working space of said second electrode by capillary forces, and said second electrode is a cathode;

a fuel gas supply connected to said first electrode;

an oxidizing gas supply connected to said second electrode.

4. A fuel cell according to claim 1 wherein said first electrode is made of a metal wire wound spiral wherein helical spacing of said spiral does not exceed 200 micrometers.

5. A fuel cell according to claim 1 wherein said second electrode is made of a metal wire wound spiral wherein helical spacing of said spiral does not exceed 200 micrometers.

6. A fuel cell according to claim 1 wherein said first electrode comprises nickel or its alloys.

7. A fuel cell according to claim 1 wherein said second electrode comprises lithinated nickel oxide.

8. A fuel cell according to claim 1 wherein the fuel gas is hydrogen.

9. A fuel cell according to claim 1 wherein the fuel gas is synthesis gas.

10. A fuel cell according to claim 1 wherein the fuel gas is methane or natural gas.

11. A fuel cell according to claim 1 wherein the molten carbonate further comprises a mix of lithium, potassium and sodium carbonates.

12. A fuel cell according to claim 1 wherein the oxidizing gas is oxygen or air.

13. A fuel cell according to claim 1 wherein said pores of each of said first electrode and said second electrode are dimensioned to be in the range of 1–200 micrometers.

* * * * *